United States Patent [19]

Toki

[11] Patent Number: 4,825,428
[45] Date of Patent: Apr. 25, 1989

[54] OPTOMAGNETIC RECORDING, READING AND ERASING METHOD AND IMPLEMENTING APPARATUS WHICH PERMITS OVERWRITING OF PREVIOUSLY RECORDED INFORMATION

[75] Inventor: Kaoru Toki, Tokyo, Japan

[73] Assignee: NEC Corporation, Tokyo, Japan

[21] Appl. No.: 831,198

[22] Filed: Feb. 20, 1986

[30] Foreign Application Priority Data

Feb. 20, 1985 [JP] Japan ................................. 60-31958

[51] Int. Cl.[4] ...................... G11B 11/14; G11B 13/04
[52] U.S. Cl. .................................. 369/13; 360/114; 365/122
[58] Field of Search ................... 369/13, 45; 360/114, 360/118, 59; 365/122; 335/209, 297, 236, 237

[56] References Cited

U.S. PATENT DOCUMENTS

| 1,828,190 | 10/1931 | Kilini | 360/118 |
| 3,624,623 | 11/1971 | Breton, Jr. | 365/122 |
| 4,558,440 | 12/1985 | Tomita | 360/114 |
| 4,610,009 | 9/1986 | Connell | 360/114 |

FOREIGN PATENT DOCUMENTS

| 57-27452 | 2/1982 | Japan | 369/13 |
| 59-119507 | 7/1984 | Japan | 360/114 |
| 60-147950 | 8/1985 | Japan | 360/114 |
| 60-151811 | 8/1985 | Japan | 360/118 |
| 8404198 | 10/1984 | World Int. Prop. O. | 335/209 |

Primary Examiner—Alan Faber
Assistant Examiner—Hoa T. Nguyen
Attorney, Agent, or Firm—Sughrue, Mion, Zinn, Macpeak and Seas

[57] ABSTRACT

An apparatus and a method for recording, reading and erasing information, which use, as a recording medium, a magnetic film having vertical magnetic anisotropy characteristics and record, read and erase information by means of a laser beam and an external magnetic field applied to the magnetic medium. These are characterized in that the application of the external magnetic field to the recording medium is controlled by controlling the magnetic field provided by a permanent magnet put at a predetermined distance from the recording medium. For controlling the magnetic field, means for applying an external magnetic field to a recording medium is employed, which comprises a permanent magnet, a magnetic core of a high magnetic permeability material comprising a pole piece attached to at least one pole of the permanent magnet and a lag piece integrally connected to the pole piece and having a wire wound therearound, and an electric current source supplying electric current to the wire wound of the core.

17 Claims, 6 Drawing Sheets

FIGURE 1

3 — optical head
6 — laser source
19 — laser modulating circuit

OPTOMAGNETIC RECORDING, READING AND ERASING METHOD AND IMPLEMENTING APPARATUS WHICH PERMITS OVERWRITING OF PREVIOUSLY RECORDED INFORMATION

FIELD OF THE INVENTION

The present invention relates to a method and apparatus for recording, reading and erasing information with the aid of a laser beam.

DESCRIPTION OF THE RELATED ART

Recently the optomagnetic recording system, particularly optomagnetic disk storage has been noted for its capability of storing a large amount of information at an increased density, still advantageously permitting non-contact access to disk at an increased speed. These noted capabilities make the optomagnetic memory most attractive among large capacity file memories.

Specifically, optomagnetic disk memories which use, as a recording medium a crystalline magnetic film of MnBi, MnCuBi, MnTiBi, MnAlGe or other crystalline magnetic substances, or an amorphous magnetic film of, in combination, Tb, Gd, Dy, Ho or other rare earth metals and Fe, Co, Ni or other transition metals, advantageously permit rewriting of information, and therefore these particular optomagnetic disk memories have been a prime target for study.

In a conventional optomagnetic storage system whose recording medium is premagnetized in a given direction by means of an external magnetic field above the coercive force of the recording medium, binary information can be recorded, read out and erased as follows:

Recording uses heat generated by an intense, coherent directional beam of light, i.e., laser beam. A narrow laser beam 1 to 2 microns across is thrown onto selected areas of the recording medium to raise the temperature of these areas. In case of Curie temperature recording, the temperature of the selected areas of the recording medium is raised above the Curie temperature of the recording medium, and then the orientation of a selective magnetic domain is reversed by means of an external magnetic field or of counter magnetic field in the recording medium. In case of compensation temperature recording, the compensation temperature of the recording medium is set around the room temperature, and a selective area of the recording medium is heated by exposing to a laser beam to raise the temperature of the selective area to the extent that the coercive force of the recording medium is lowered. Then, a reversed magnetic domain is caused to appear by applying an external magnetic field to the recording medium.

Thus, binary data 1 and 0 are recorded in the form of selective inversion and non-inversion of orientation of magnetic domains.

Reading uses the magnetooptical effect, i.e., Kerr effect or Faraday effect. Specifically, when a plane-polarized beam of light passes through or reflects from the recording medium bearing binary information in the form of inversion and non-inversion of orientation of magnetic domains, the plane of polarization is rotated by a certain amount clockwise or counterclocwise, indicating which magnetic domain the light passes through or reflects from. In reading out stored binary information, the recording medium is exposed to a laser beam at a relatively low level of power, compared with the one used in recording. Binary information is retrieved from the transmitting or reflecting beam of light.

Stored information is erased in the recording medium by applying thereto an external magnetic field with the polarity opposite to that of the external magnetic field used in recording and by exposing the recording medium to a laser beam as strong as the one used in recording. Thus, stored information is erased as a whole. Then, the recording medium is subjected to an external magnetic field, so that the recording medium returns to the initial state of magnetization prior to recording.

As is well known, a necessary external magnetic field is applied to the recording medium with the aid of a solenoid (air core coil), an electromagnet or a permanent magnet.

Both recording and erasing require a magnetic field as strong as several hundred oersteads. In this connection, if a solenoid is used, it will be necessarily large, and still disadvantageously the speed at which the magnetic field is changed in direction decreases. A desired strength and distribution of magnetic flux cannot be obtained without putting the solenoid fairly close to the recording medium. Also, the electromagnet has the disadvantages of increasing the size of the device and of reducing the magnetic field switching speed. As for the permanent magnet, it requires a mechanical driving means for changing the direction of the magnetic field. As a matter of fact the mechanical driver is of complicated structure, and the magnetic field switching speed is relatively low.

In any optomagnetic storage systems as described above the speed at which the external magnetic field is changed in direction for erasing information remains relatively low, and for this reason simultaneous or non-selective erasing is necessarily adopted.

Quick modulation of laser power during application of a given constant magnetic field to the recording medium is adopted for storing information in recording. After all, no conventional optomagnetic storage systems permit "over-writing", that is, renewing information by overwriting the recorded information without the necessity of erasing the old one, thus increasing the speed at which recording is renewed.

SUMMARY OF THE INVENTION

In view of the defects of conventional optomagnetic storage systems as described above, one object of the present invention is to provide an improved optomagnetic recording, reading and erasing method permitting "over-writing".

Another object of the present invention is to provide an improved optomagnetic recording, reading and erasing apparatus permitting "over-writing".

In an optomagnetic storage system to which the present invention relates use is made of a recording medium of magnetic coating of the vertical magnetic anisotropy, and predetermined information is recorded, read out and erased by means of, in combination a laser beam and an external magnetic field. The principle of the present invention resides in controlling the influence of magnetic flux from at least one permanent magnet put on at least one side of the recording medium, thereby controlling the application of the external magnetic field to the recording medium.

An optomagnetic recording, reading and erasing apparatus according to the present invention comprises an optical head; at least one permanent magnet unit, the permanent magnet unit comprising a permanent magnet and a magnetic core of a high magnetic permeability material, said core being composed of a pole piece attached to at least one pole of the permanent magnet and a leg piece integrally connected to the pole piece and having a wire winding therearound; and an electric current source supplying electric current to the winding.

According to the present invention, there is provided an optomagnetic recording, reading and erasing apparatus comprising:

an optical head including an optical system for throwing a laser beam onto a recording medium for heating selective areas of the recording medium and for receiving the laser beam after passing through or reflecting from the recording medium in reading information;

a servo control unit responsive to the transmitting or reflecting laser beam for reducing forcussing and/or tracking errors, if any; and means for applying an external magnetic field to the recording medium alternately in opposite directions perpendicular to the recording medium, said apparatus being characterized in that said applying means comprises:

at least one permanent magnet assembly being disposed at one side of the recording medium and said permanent magnet assembly having a permanent magnet and a magnetic core equipped with a wire winding; and an electric current source applying electric current to the wire winding of the permanent magnet assembly.

The apparatus may include a pair of permanent magnet assemblies being disposed respectively at the opposite sides of the recording medium.

According to the present invention, there is also provided an optomagnetic recording, reading and erasing method comprising the steps of:

throwing a laser beam onto a recording medium; and applying an external magnetic field to selective areas of the recording medium depending on the information to be stored, thereby storing information in term of inversion and non-inversion of orientation of magnetic domains.

The application of the external magnetic field to the recording medium is controlled by controlling the magnetic field provided by a permanent magnet disposed at a predetermined distance from the recording medium.

Other objects and advantages of the present invention will be understood from the following description of preferred embodiments and accompanying drawings:

DESCRIPTION OF THE PREFERRED EMBODIMENTS OF THE INVENTION

Now, referring to the drawings, an optomagnetic storage system according to the present invention will be described below.

Figure 1:
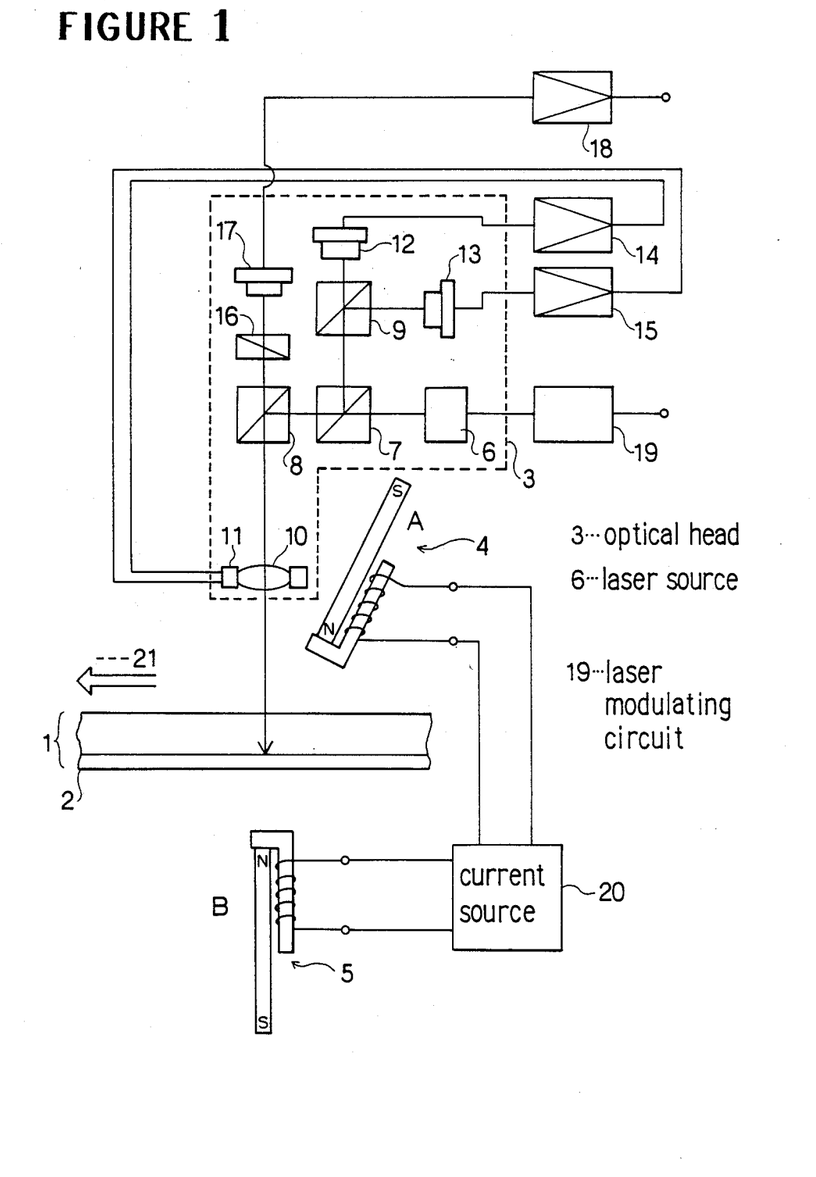
FIG. 1 shows diagrammatically an optomagnetic, binary information recording, reading and erasing apparatus according to one embodiment of the present invention.

Specifically referring to FIG. 1, an optomagnetic disk 1 is shown as having a magnetic film or coating 2 as a recording medium. It has vertical magnetic anisotropy characteristics. An optical head 3 is positioned above the optomagnetic disk 1, and two external magnetic field applying means 4 and 5 are put at the opposite sides of the recording disk 1. The optomagnetic head 3 (broken lines) is an ordinary one comprising an optical system for recording, reading and erasing information and an optical detecting system, both will be described hereinafter somewhat in detail. What is to be noted here is: the external magnetic field applying means is different from the ordinary one appearing in a conventional optomagnetic storage system.

Figure 2:
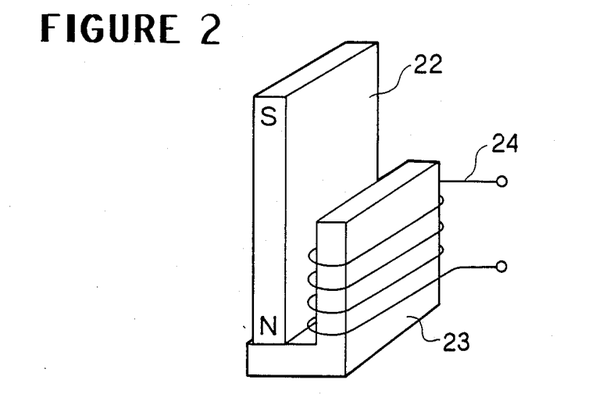
FIG. 2 shows a perspective view of an external magnetic field applying means.

FIG. 2 shows such an external magnetic field applying means as comprising a permanent magnet slate 22, and an L-shaped core 23 of a high magnetic permeability material composed of a pole piece attached to one pole of the permanent magnet slate facing the recording medium, and an upright leg having a wire winding 24 therearound. The wire winding 24 is connected to an electric current source 20 (See FIG. 1).

Figure 3:
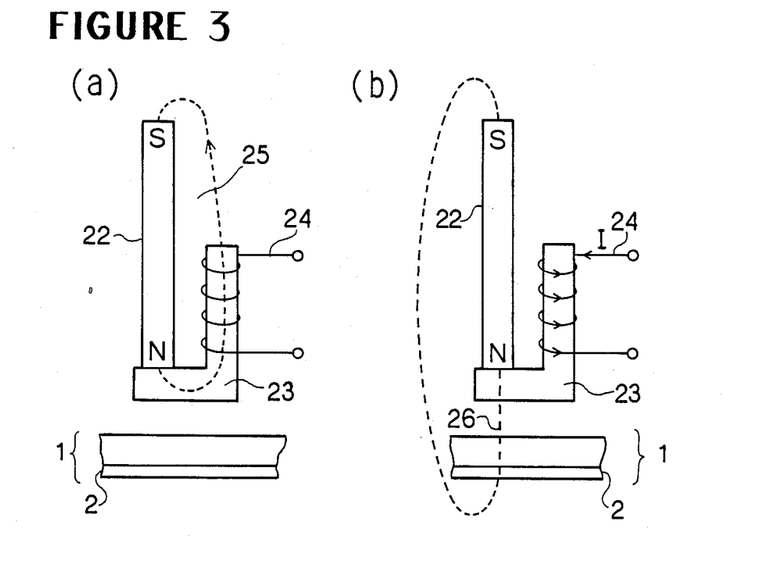
FIGS. 3a and 3b show how the external magnetic field applying means of FIG. 2 works.
FIG. 3c is a graphic representation of the relationship between the strength of the external magnetic field and the amount of the electric current flowing in the wire winding of the core of the external magnetic field applying means.
Figure 4:
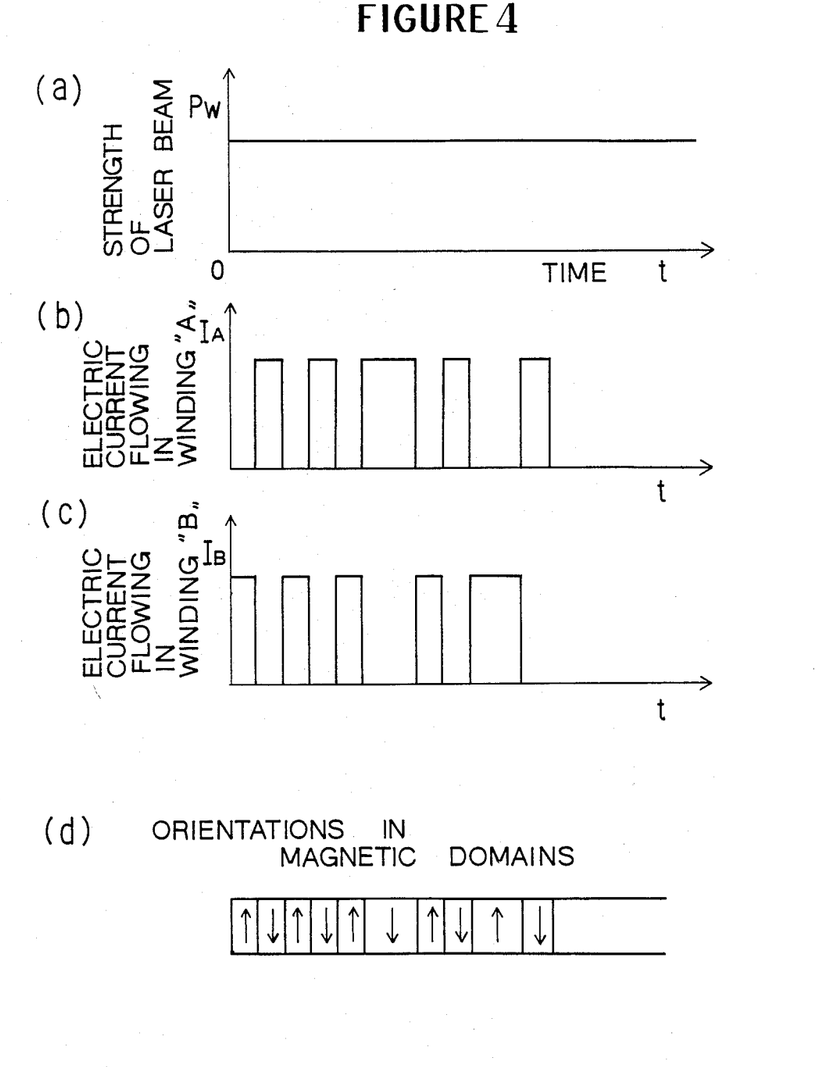
FIGS. 4a to 4d are graphs showing how binary information is stored for registration according to the principle of the present invention.

As seen from FIG. 3, application and non-application of the magnetic field to the recording medium 1 can be controlled by supplying or stopping electric current to the wire winding 24.

Specifically, when no electric current is supplied to the wire winding 24, the core 23 provides a magnetic path, thereby allowing the magnetic flux to follow a possible shortest way from one to the other pole of the permanent magnet (See FIG. 3a). Thus, litle or no magnetic flux passes through the underlying recording medium. On the other hand, when an electric current I flows in the wire winding 24, the core 23 is partly filled with the magnetic flux generated by the electric current to purge corresponding amount of magnetic flux extending from one to the other pole of the permanent magnet, thereby causing application of bias magnetic flux perpendicular to the recording medium 1 (See FIG. 3b).

FIG. 3c shows the relationship between the electric current I and the resulting bias magnetic flux $H_B$. As shown, the bias magnetic flux $H_B$ increases with increase of the electric current I. The bias magnetic flux $H_B$ tends to reach the maximum as the core 23 is getting close to saturation. The same bias magnetic field as the one obtained by a permanent magnet used in a conventional optomagnetic storage system is formed when an electric current increases above Is.

Referring again to FIG. 1, such external magnetic field applying means 4 and 5 are put with their N-poles opposite to each other on the opposite sides of the recording medium 1. Thus, when an electric current flows in the wire winding of the upper permanent magnet unit 4, the downward bias magnetic field is applied to the recording medium 1 whereas when an electric current flows in the wire winding of the lower permanent magnet unit 5, the upward bias magnetic field is applied to the recording medium 1. The bias magnetic field can be changed in direction simply by selecting which wire winding is supplied with electric current.

As regards the upper external magnetic field applying means 4 put on the same side as the optomagnetic head 3 with respect to the recording medium 1, it should be put away from the optical path, somewhat inclined, not constituting any hindrance to the laser beam. Considering the amount of the vertical component of the magnetic flux available to the recording medium 1, the upper permanent magnetic unit is preferably inclined at 45 degrees with respect to the recording medium 1.

Samarium cobalt magnets, alrico magnets or ferrite magnets, each several milimeters thick, several to several ten milimeters long and across were used. Cores were made of slates of NiFe alloy, NiZn ferrite or MnZn ferrite (soft ferrite) each several milimeters thick and several to several ten milimeters long and across were practically used. Copper wires several ten to several hundred microns across were used in the wire winding 24. Electric current Is ranging from several ten to several hundred milliamperes were supplied to the wire wound.

The inductance L of the wire winding of such external magnetic field applying means can be easily reduced to one or less micro-henrys. The use of such low-inductance device enables the quick changing of as strong a magnetic field as several hundred oersted's at a frequency of several megahertz from a position several milimeters apart from the recording medium.

The optomagnetic head 3 appearing in FIG. 1 is of a conventional structure. A linear-polarization laser source is designated at 6, and for instance it is a semiconductor laser. Beam-splitters are designated at 7, 8 and 9. A laser beam condenser lens 10 is supported by an actuator 11. A focus error photoelectric detector 12 provides a focus error signal whereas a tracking error photoelectric detector 13 provides a tracking error signal. These signals are fed back to an actuator 11 as servo signals via corresponding servo control units 14 and 15.

The reflected laser beam whose angle of rotation of polarization represents information such as a bit of binary information is detected by a signal reading photoelectric detector 17 after passing through a polarization filter 16, and the corresponding electric signal appearing at the output of the photoelectric detector 17 is directed to an amplifier 18.

A Graham-Thomson prism may be used as a polarization filter 16. APIN photodiode may be used as a signal reading photoelectric detector 17. A laser modulating circuit 19 is connected to the laser source 6 for controlling the strength of laser beam in a way most appropriate to recording, reading and erasing.

Now, the operation of an optomagnetic recording, reading and erasing apparatus according to the present invention is described below.

FIGS. 4a to 4d show how binary information is recorded in a recording medium. While applying to the recording medium a laser beam strong enough to raise the temperature of the recording medium above its Curie temperature (See FIG. 4a), electric currents $I_A$ and $I_B$ are alternately supplied to the external magnetic field applying means 4 and 5 (see FIGS. 4b and 4c), thereby recording bits of binary information in subsequent magnetic domains in the form of inversion and non-inversion of the orientation of magnetization depending on the direction in which the external magnetic field is instantaneously applied to the recording medium (See FIG. 4d).

In contrast to selective inversion of orientation of magnetic domains in a undirectionally magnetized coating in a conventional recording method, the orientation of selective magnetic domains is determined by selecting which external magnetic field applying means is to be energized.

Thus, the present invention requires no clearing of recorded information prior to renewal of stored contents. Retrieval of informations from the recording medium is conducted in the same way as a conventional optomagnetic storage system. Specifically, binary information is retrieved in terms of the clockwise and counterclockwise rotations of the polarization plane of the laser beam after passing through or reflecting from the recording medium.

Figure 5:
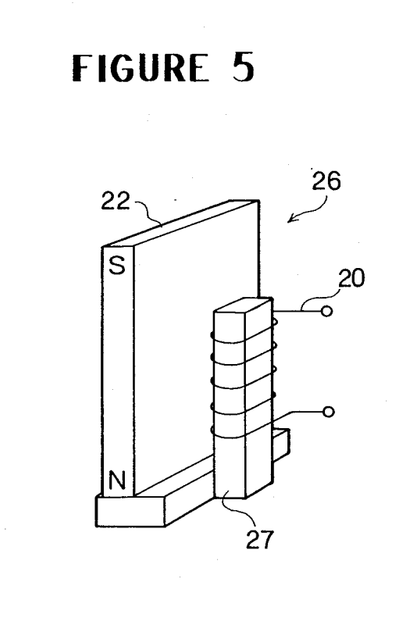
FIG. 5 is a perspective view showing a first embodiment of an external magnetic field applying means.
Figure 6:
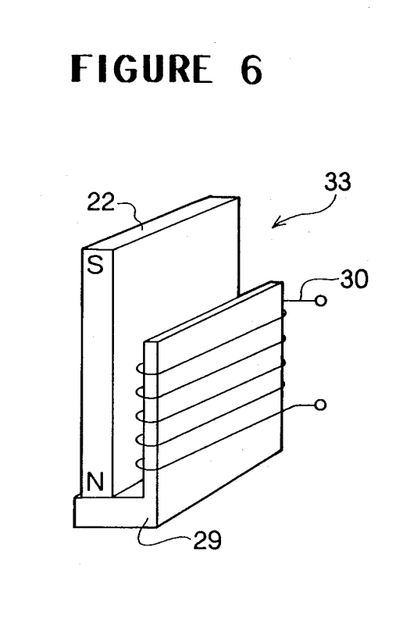
FIG. 6 is a perspective view showing a second embodiment of an external magnetic field applying means.
Figure 7:
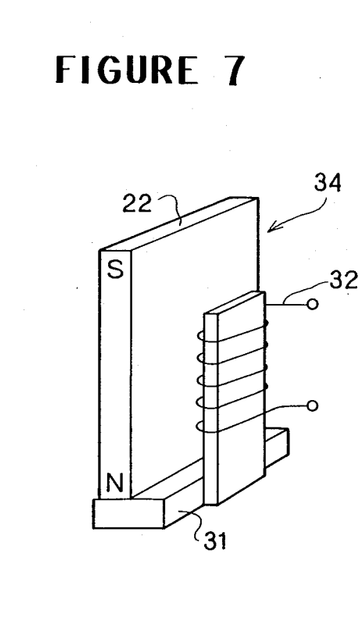
FIG. 7 is a perspective view showing a third embodiment of external magnetic field applying means.

FIGS. 5 and 7 show a variety of external magnetic field applying means.

Specifically, FIG. 5 shows a unit 26 as comprising a permanent magnet 22 and an L-shaped core 27 whose leg (having a wire winding 28 therearound) is narrow, compared with the permanent magnet 22.

FIG. 6 shows a unit 33 as comprising a permanent magnet 22 and an L-shaped core 29 whose leg (having a wire winding 30 therearound) is thin, compared with the permanent magnet.

FIG. 7 shows a unit 34 as comprising a permanent magnet 22 and an L-shaped core 31 whose leg (having a wire winding 32 therearound) is narrow and thin, compared with the permanent magnet.

These modifications have an uprising leg of reduced crosssection, compared with the corresponding part of the unit of FIG. 2, thereby causing the leg to be saturated with a reduced amount of electric current in the wire winding and hence permitting a quick and easy switching of application of the external magnetic field to the recording medium.

Figure 8:
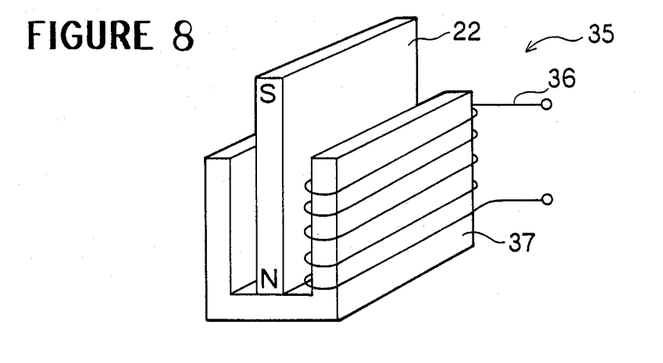
FIG. 8 is a perspective view showing a forth embodiment of external magnetic field applying means.

FIG. 8 shows still another modification of the unit 35 using a U-shaped core 37, thereby assuring that the magnetic flux is effectively guided from one to the other pole of the permanent magnet. As shown in FIG. 8, the applying unit 35 includes a permanent magnet 22 and a U-shaped core 37 which has a pole piece attached to one pole of the permanent magnet 22 and two upright legs, one 37 of which has a wire winding 36 therearound. Thus, when no electric current flows in the wire winding, the leakage amount of the magnetic flux to the recording medium is reduced to possible minimum.

Figure 9:
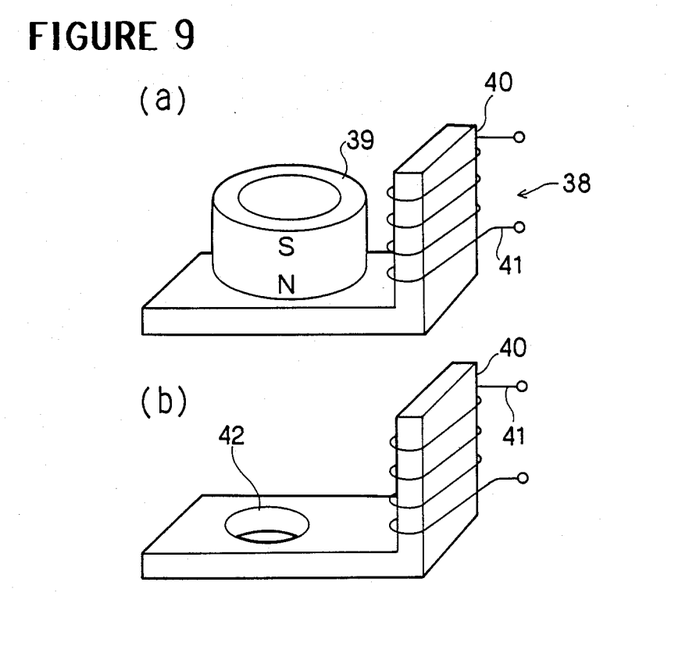
FIGS. 9a and 9b are perspective view showing a fifth embodiment of external magnetic field applying means.

FIGS. 9a and 9b show yet still another modification of the unit 38, which comprises an annular (ring shaped) permanent magnet 39 vertically magnetized and an L-shaped core 40 whose pole piece has a hole 42. The diameter of the hole 42 is not larger than that of the annular permanent magnet 39. The circular space of the ring shaped permanent magnet 39 and the hole 42 of the pole piece of the core 40 are disposed in alignment with each other and provide an optical path, and therefore the unit 38 can be put just below the optical head without causing any hindrance to the laser beam.

The pole piece of the core may be fixed to one pole of the permanent magnet by means of adhesive agent, constituting a discontinuity at the interface between the permanent magnet and the pole piece of the core. Preferably the pole piece of the core is not smaller than the pole of the permanent magnet. The pole piece, however, may be reduced in size so far as no adverse effect is caused on recording and erasing.

The electric current source may be equipped with a current control. Otherwise, necessary current control may be provided as a separate unit. Two pole pieces may be attached to the permanent magnet.

Some data of practical example of an optomagnetic storage system as shown in FIG. 1 are given as follows: an external magnetic field applying means of FIG. 7 was used. The permanent magnet 22 was an alnico magnet 40 mm across, 40 mm long, and 5 mm thick. The core 31 was made of Mn—Zn soft ferrite. The pole piece of the core was 45 mm across and 3 mm thick, and the leg of the core was 10 mm across, 15 mm long, and 2 mm thick. The pole piece of the core was fixed to one pole of the permanent magnet by means of epoxyresin. The adhesive layer was several microns thick. Copper wire of 100 microns across was used to provide a 30 turn-wire winding. Two external magnetic field applying units thus constructed were put 2 mm apart from the recording medium at opposite sides thereof.

An optomagnetic disk was composed of a plastic substrate coated with TeFe 1000 Å thick. The disk was rotated at the linear speed of 9 meters per sec.

A laser beam was radiated onto the surface of the disk. The strength of the laser beam as measured just above the disk was 4 mW. An electric current of 0.5 amperes were supplied alternately to the external magnetic field applying units A and B to record signals at the frequency of 0.5 MHz.

When read out, the carrier to noise ratio, C/N, was about 40 dB. Subsequently, signals at the frequency of 1 MHz were written on the same track as previous 0.5 MHz signals were already written. When read out, the figure of C/N was about 40 dB, showing good results of "over-writing".

As is apparent from the above, the present invention permits quick changing of external magnetic field in direction, and hence "overwriting" in the optomagnetic recording, reading and erasing system.

While the invention has been described in connection with preferred embodiments, it is not intended to limit the scope of the invention to the particular form set forth, but, on the contrary, it is intended to cover such alternatives, modifications, and equivalents as may be included within the spirit and the scope of the invention as defined by the appended claims.

What is claimed is:

1. An optomagnetic recording and reading apparatus comprising:
    an optical head for applying a laser beam onto a recording medium for heating the recording medium and for receiving the laser beam after passing through or reflecting from the recording medium in reading information;
    a servo control unit responsive to the transmitted or reflected laser beam received by said optical head for reducing focussing and/or tracking errors; and
    means for applying an external magnetic field to the recording medium, said applying means comprising a pair of permanent magnet assemblies disposed respectively at the opposite sides of the recording medium, each of said permanent magnet assemblies having a permanent magnet and a magnetic core equipped with a wire winding, and an electric current source supplying electric current to the wire windings of the permanent magnet assemblies.

2. An optomagnetic recording and reading apparatus according to claim 1, wherein said applying means further comprises means for applying the electric current from said current source to a selected wire winding in accordance with the information to be stored.

3. An optomagnetic recording and reading apparatus according to claim 1, wherein said magnetic core is generally in the shape of the letter, "L", having at least one pole piece attached to one pole of the permanent magnet and an upright leg integrally connected to the pole piece and having a wire winding therearound.

4. An optomagnetic recording and reading apparatus according to claim 3, wherein said upright leg has a cross-section smaller than that of the permanent magnet.

5. An optomagnetic recording and reading apparatus according to claim 4, wherein said upright leg is as broad as the permanent magnet, but is thinner than the permanent magnet.

6. An optomagnetic recording and reading apparatus according to claim 4, wherein said upright leg is as thick as the permanent magnet, but is narrower than the permanent magnet.

7. An optomagnetic recording and reading apparatus according to claim 4, wherein said upright leg is narrower and thinner than the permanent magnet.

8. An optomagnetic recording and reading apparatus according to claim 1, wherein said magnetic core is generally in the shape of the letter, "U", having a pole piece attached to one pole of the permanent magnet and two upright legs integrally connected to the opposite ends of the pole piece, one of these upright legs having a wire winding therearound.

9. An optomagnetic recording and reading apparatus according to claim 1, wherein said permanent magnet is ring shaped, and said magnetic core is generally in the form of the letter, "L", having at least one pole piece attached to one pole of the permanent magnet and an upright leg integrally connected to one end of the pole piece and having a wire winding therearound, said pole piece having a hole in alignment with the circular space of the annular permanent magnet.

10. An optomagnetic recording and reading apparatus including an optical head and means for applying an external magnetic field to a recording medium,
    said apparatus being characterized in that said means for applying an external magnetic field comprises a pair of permanent magnet assemblies being disposed respectively at opposite sides of the recording medium, each of said paired permanent magnet assemblies comprising a permanent magnet, an L-shaped magnetic core of a high magnetic permeability material comprising a pole piece attached to at least one pole of the permanent magnet and a leg piece integrally connected to the pole piece and having a wire winding therearound, and an electric current source supplying electric current to the wire winding of the core.

11. An optomagnetic recording and reading apparatus according to claim 10, wherein said leg piece has a cross-section smaller than that of the permanent magnet.

12. An optomagnetic recording and reading apparatus according to claim 11, wherein said leg piece is as broad as the permanent magnet, but is thinner than the permanent magnet.

13. An optomagnetic recording and reading apparatus according to claim 11, wherein said leg piece is as thick as the permanent magnet, but is narrower than the permanent magnet.

14. An optomagnetic recording and reading apparatus according to claim 11, wherein said leg piece is narrower and thinner than the permanent magnet.

15. An optomagnetic recording and reading apparatus according to claim 10, wherein said magnetic core is generally in the shape of the letter, "U", having a pole piece attached to one pole of the permanent magnet and two leg pieces integrally connected to the opposite ends of the pole piece, one of these leg pieces having a wire winding therearound.

16. An optomagnetic recording and reading apparatus according to claim 10, wherein said permanent magnet is ring shaped, and said magnetic core is generally in the form of the letter, "L", having at least one pole piece attached to one pole of the permanent magnet and a leg piece integrally connected to one end of the pole piece and having a wire winding therearound, said pole piece having a hole in alignment with the circular space of the annular permanent magnet.

17. An apparatus for recording and reading a perpendicularly magnetizable magneto-optical recording medium, including an optical head applying a laser beam onto the recording medium and receiving the laser beam after it has passed through or been reflected from the recording medium, and means for applying an external magnetic field to the recording medium in the neighborhood of a domain where the laser beam is impinged onto the recording medium, characterized in that, said means for applying an external magnetic field comprises a first permanent magnet assembly and a second permanent magnet assembly each consisting of a permanent magnet and a core of high permeability material having a winding thereabout and disposed respectively at the opposite sides of the recording medium, and, said windings being connected to such an electric current source that energizes said windings of the first and second permanent magnet assemblies alternately so that the first permanent magnet assembly creates a magnetic field having a predetermined intensity of magnetic flux and passing through the recording medium in a first direction and the second permanent magnet assembly creates a magnetic field having a predetermined intensity of magnetic flux and passing through the recording medium in a second direction which is opposite to the first direction.

* * * * *

UNITED STATES PATENT AND TRADEMARK OFFICE
CERTIFICATE OF CORRECTION

PATENT NO. : 4,825,428

DATED : April 25, 1989

INVENTOR(S) : KAORU TOKI

It is certified that error appears in the above-identified patent and that said Letters Patent is hereby corrected as shown below:

[57] Abstract should be:

-- An apparatus and method for recording, reading and erasing information from a magnetic film having vertical magnetic anisotropy characteristics using a laser beam and an external magnetic field applied to the magnetic film. The magnetic field is produced by a permanent magnet positioned a predetermined distance from the recording medium, a magnetic core of a high magnetic permeability material which includes a pole piece attached to at least one pole of the permanent magnet and a leg piece integrally connected to the pole piece and having a wire winding therearound, and an electric current source supplying electric current to the wire winding of the core, the magnetic field being controlled to permit overwriting. --

Signed and Sealed this

Seventeenth Day of April, 1990

Attest:

HARRY F. MANBECK, JR.

*Attesting Officer*  *Commissioner of Patents and Trademarks*